United States Patent [19]

Nakayama et al.

[11] Patent Number: 5,270,994
[45] Date of Patent: * Dec. 14, 1993

[54] MAGNETO-OPTICAL RECORDING AND READING METHOD

[75] Inventors: Junichiro Nakayama, Shiki; Tomoyuki Miyake; Hiroyuki Katayama, both of Nara; Kenji Ohta, Kita, all of Japan

[73] Assignee: Sharp Kabushiki Kaisha, Osaka, Japan

[ * ] Notice: The portion of the term of this patent subsequent to Dec. 29, 2009 has been disclaimed.

[21] Appl. No.: 931,990

[22] Filed: Aug. 19, 1992

Related U.S. Application Data

[63] Continuation of Ser. No. 575,013, Aug. 30, 1990, Pat. No. 5,175,721.

[30] Foreign Application Priority Data

Sep. 8, 1989 [JP] Japan .................. 1-234205

[51] Int. Cl.⁵ .............................. G11B 7/00
[52] U.S. Cl. ..................... 369/100; 369/13; 360/114
[58] Field of Search ............ 369/13, 110, 100; 360/114

[56] References Cited

U.S. PATENT DOCUMENTS

| | | | |
|---|---|---|---|
| 5,016,232 | 5/1991 | Tadokoro et al. | 369/13 |
| 5,132,945 | 7/1992 | Osato et al. | 369/13 |
| 5,175,721 | 12/1992 | Nakayama et al. | 369/110 |

FOREIGN PATENT DOCUMENTS

| | | |
|---|---|---|
| 0258978 | 3/1988 | European Pat. Off. |
| 0288069 | 10/1988 | European Pat. Off. |
| 0319004 | 6/1989 | European Pat. Off. |

Primary Examiner—Paul M. Dzierzynski
Assistant Examiner—Don Wong
Attorney, Agent, or Firm—Nixon & Vanderhye

[57] ABSTRACT

A recording and reading method and device of magneto-optical memory elements are provided to record and read an information signal to and from the magneto-optical memory elements, which contain at least two magnetic layers that are magnetically coupled, by means of a light-intensity modulated overwriting method employing a recording magnetic field and an initializing magnetic field. A control feature is included for applying the initializing magnetic field to the magneto-optical memory elements at least one time between the point of time when moving the magneto-optical memory elements to a recording or reading position, finishing a reading or recording, and ascertaining the selected operation such as recording or erasing and the point of time when subsequent recording begins such that the initializing magnetic field is not applied at the same time as the recording magnetic field.

5 Claims, 4 Drawing Sheets

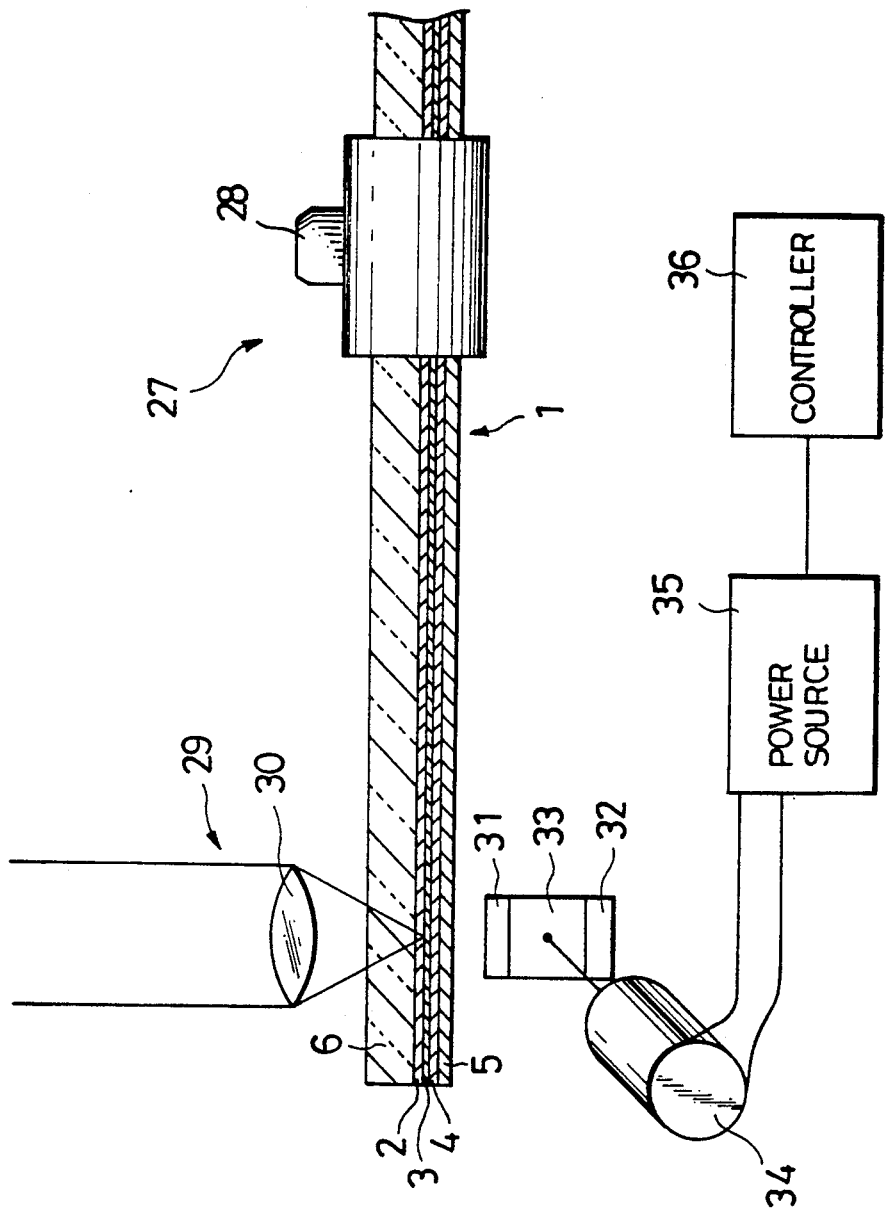

MAGNETO-OPTICAL RECORDING AND READING METHOD

This is a continuation of application Ser. No. 07/575,013, filed Aug. 30, 1990, now U.S. Pat. No. 5,175,721.

BACKGROUND OF THE INVENTION

1. Field of the Invention

The present invention relates to a recording and reading method and device of magneto-optical memory elements by means of a light-intensity modulated overwriting method.

2. Description of the Related Art

A normal recording and reading device of magneto-optical memory elements, as disclosed in the Japanese Patent Application Laying Open (KOKAI) No. 62-175948 and SPIE Vol. 1078 Optical Data Storage Topical Meeting (1989) pp 258–264, is designed so that a light-intensity modulated overwriting can be carried out on the magneto-optical memory elements containing a magnetic multi-layer film. The normal recording and reading device of the magneto-optical memory elements includes an optical head containing an objective lens and a laser source for irradiating a laser beam to the magneto-optical memory elements and modulating the intensity of the laser beam to high or low level, means for applying a recording magnetic field to the magneto-optical memory elements, and means for applying an initializing magnetic field to the magneto-optical memory elements.

If no cover, such as a cartridge case, is applied to the magneto-optical memory elements (for example, a compact disc), the light-intensity modulated overwriting can be carried out by the foregoing recording and reading device. In addition, the initializing magnetic field is applied to the magneto-optical memory elements at all the times or alternatively only during a recording. If, however, a cover such as a cartridge case is applied to the magneto-optical memory elements (for example, a floppy disk), it is difficult to obtain space which is wide enough to install both the means for applying the recording magnetic field to the magneto-optical memory elements and the means for applying the initializing magnetic field to the magneto-optical memory elements, because two separate means are required for applying the magnetic fields to the magneto-optical memory elements, in the foregoing recording and reading device. Therefore, the light-intensity modulated overwriting cannot be carried out on the magneto-optical memory elements which are accommodated in a cartridge case.

SUMMARY OF THE INVENTION

It is therefore an object of the present invention to provide a recording and reading method of magneto-optical memory elements which is capable of recording and reading an information signal to and from the magneto-optical memory elements containing at least two magnetic layers by means of a light-intensity modulated overwriting method, even if the magneto-optical memory elements are accommodated in a cover.

It is another object of the present invention to provide a recording and reading device of magneto-optical memory elements which is capable of recording and reading an information signal to and from the magneto-optical memory elements containing at least two magnetic layers by means of the light-intensity modulated overwriting method, even if the magneto-optical memory elements are accommodated in a cover.

According to a first aspect of the present invention, a recording and reading method is designed to record and read an information signal to and from magneto-optical memory elements, which contains at least two magnetic layers that are magnetically coupled, by means of a light-intensity modulated overwriting method employing a recording magnetic field and an initializing magnetic field, the initializing magnetic field being applied to the magneto-optical memory elements at least one time between the point of time when moving the magneto-optical memory elements to a recording or reading position, finishing a reading or recording, and ascertaining the selected operation such as recording or erasing and the point of time when subsequent recording begins, and an information signal is recorded or read to or from the magneto-optical memory elements.

According to a second aspect of the present invention, a recording and reading device is designed to record and read an information signal to and from magneto-optical memory elements, which contain at least two magnetic layers that are magnetically coupled, by means of a light-intensity modulated overwriting method employing a recording magnetic field and an initializing magnetic field, the device including means for applying the recording magnetic field to the magneto-optical memory elements, means for applying the initializing magnetic field to the magneto-optical memory elements at the same position where the recording magnetic field is applied by the means for applying the initializing magnetic field, means for controlling the means for applying the recording magnetic field and the means for applying the initializing magnetic field so that the recording magnetic field is applied to the magneto-optical memory elements at least one time between the point of time when moving the magneto-optical memory elements to a recording or reading position, finishing a reading or recording, and ascertaining the selected operation such as recording or erasing and the point of time when subsequent recording begins, and means for modulating intensity of a light beam in response to a recording signal during a recording.

The means for applying the recording magnetic field and the means for applying the initializing magnetic field can be composed of only one electromagnet.

Alternately, the means for applying the recording magnetic field and the means for applying the initializing magnetic field can be composed of different magnets. In this case, it may be possible to provide means for alternately moving magnets which is capable of generating either one of the recording magnetic field and the initializing magnetic field by moving either one of the magnets in response to the control of the means for controlling the means for applying the recording magnetic field and the means for applying the initializing magnetic field.

In operation, according to the foregoing recording and reading method of the magneto-optical memory elements, it is designed to record and read an information signal to and from the magneto-optical memory elements containing at least two magnetic layers magnetically coupled and laminated by means of the light-intensity modulated overwriting method and to apply the initializing magnetic field to the magneto-optical memory elements at least one time between the point of time when setting the magneto-optical memory elements on a recording or reading position, finishing a reading or recording, and making sure of the operations such as recording or erasing and the point of time when subsequent recording begins. In other words, it does not serve to apply the initializing magnetic field and the recording magnetic field at a single time. The application position of the recording magnetic field is the same as that of the initializing magnetic field. It results in allowing an information signal to be recorded on the magneto-optical memory elements accommodated in a cover such as a cartridge case by means of the light-intensity modulated overwriting method. Further, if the initializing magnetic field is set to be applied to the magneto-optical memory elements at least one time between the point of time when setting the magneto-optical memory elements on a recording or reading position, finishing a reading or recording, and making sure of the operations such as recording or erasing and the point of time when subsequent recording begins, one magnetic layer of the foregoing at least two magnetic layers contained in the magneto-optical memory elements is left constantly initialized. It results in being able to realize the recording by means of the light-intensity modulated overwriting at any time.

According to the recording and reading device of the magneto-optical memory elements, for achieving the recording and reading an information signal by means of the light-intensity modulated overwriting method, it is designed to provide the means for applying the recording magnetic field to the magneto-optical memory elements, the means for applying the initializing magnetic field to the magneto-optical memory elements so that it can apply the initializing magnetic field to the magneto-optical memory elements at least one time between the point of time when setting the magneto-optical memory elements on a recording or reading position, finishing a reading or recording, and making sure of the operations such as recording or erasing and the point of time when subsequent recording begins. As such, the initializing magnetic field and the recording magnetic field cannot be applied at the same time, and the means for applying the recording magnetic field cannot apply the recording magnetic field at the same position where the means for applying the initializing magnetic field can apply the initializing magnetic field. It results in being able to realize the recording by means of the light-intensity modulated overwriting on the magneto-optical memory elements accommodated in the cover like a cartridge case.

Further, as described above, if the initializing magnetic field is set to be applied at least one time between the point of time when setting the magneto-optical memory elements on a recording or reading position, finishing a reading or recording, and making sure of the operations such as recording or erasing and the point of time when subsequent recording begins, one magnetic layer of the foregoing at least two magnetic layers contained in the magneto-optical memory elements is left constantly initialized. It results in being able to realize the recording by means of the light-intensity modulated overwriting at any time.

In addition, if the means for applying the recording magnetic field and the means for applying the initializing magnetic field are composed of one electromagnet, it is possible to reduce the number of parts. In this instance, switching from the recording magnetic field to the initializing magnetic field or vice versa can be achieved by adjusting the quantity or direction of the current flowing through the electromagnet.

Further objects and advantages of the present invention will be apparent from the following description of the preferred embodiments of the invention as illustrated in the accompanying drawings.

BRIEF DESCRIPTION OF THE DRAWINGS

FIG. 6 is a view illustrating magneto-optical memory elements and a recording and reading device of the magneto-optical memory elements according to a second embodiment of the invention.

DESCRIPTION OF THE PREFERRED EMBODIMENTS

A first embodiment of the present invention will be described with reference from FIG. 1 to FIG. 5.

Figure 1:
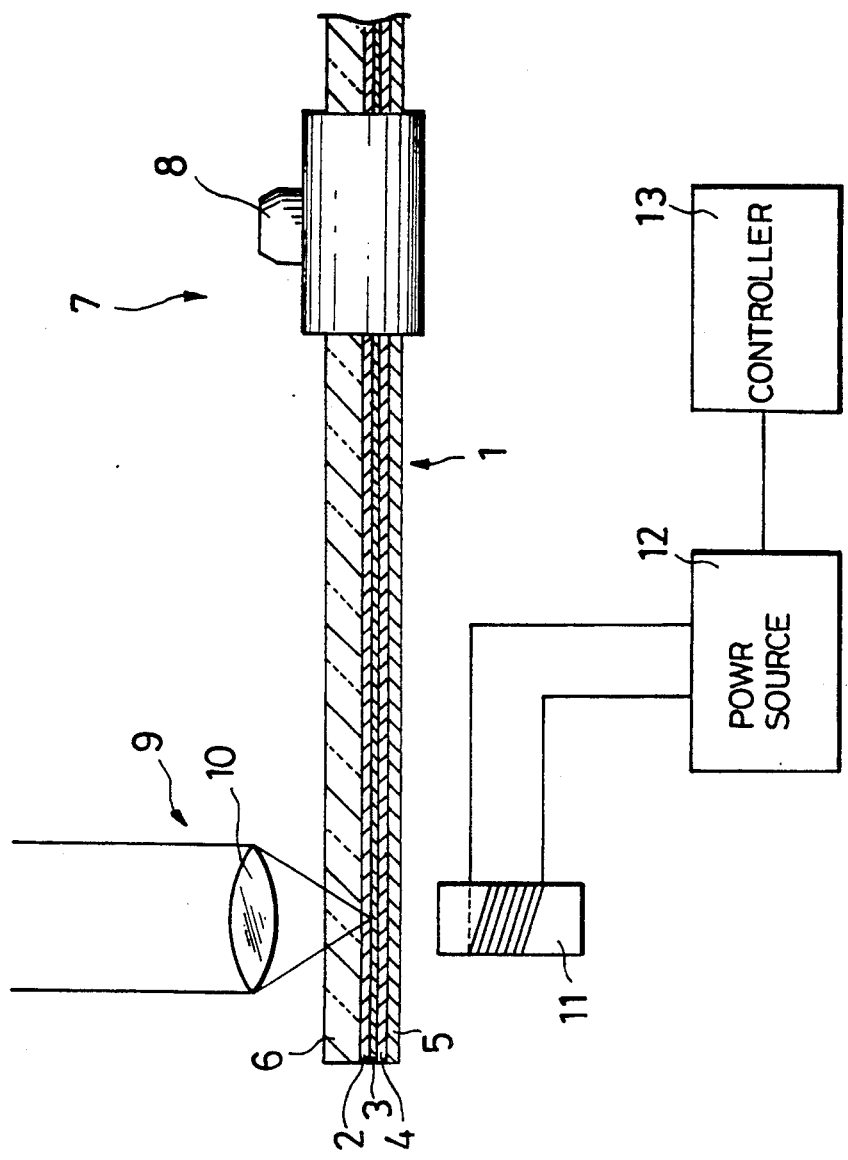
FIG. 1 is a view illustrating magneto-optical memory elements and a recording and reading device of the magneto-optical memory elements according to a first embodiment of the invention.

FIG. 1 shows a view illustrating magneto-optical memory elements and a recording and reading device of the magneto-optical memory elements according to the first embodiment of the invention.

As shown in FIG. 1, magneto-optical memory elements 1 are composed of a transparent enhancement layer 2 for enhancing a reading signal in a reading mode, magnetic layers 3, a protective layer 4, a protective coating layer 5, and a substrate 6 made of glass or transparent resin on which the transparent enhancement layer 2, the magnetic layers 3, the protective layer 4, and the protective coating layer 5 are laminated in the descriptive sequence. The magneto-optical memory elements 1 are accommodated in a cartridge case (not shown).

Figure 2:
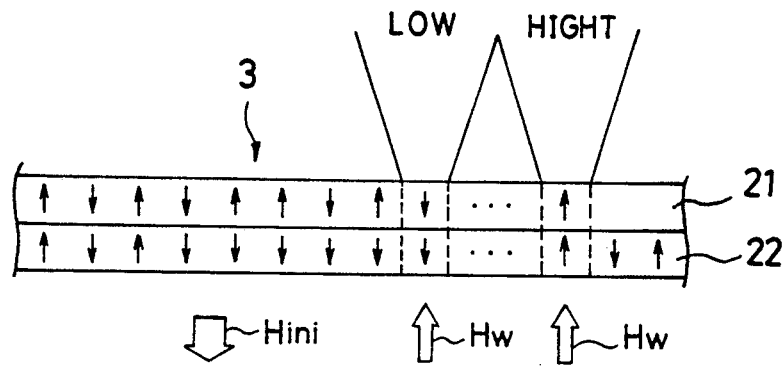
FIG. 2 is an expanded view illustrating a portion of magnetic layers.
Figure 3:
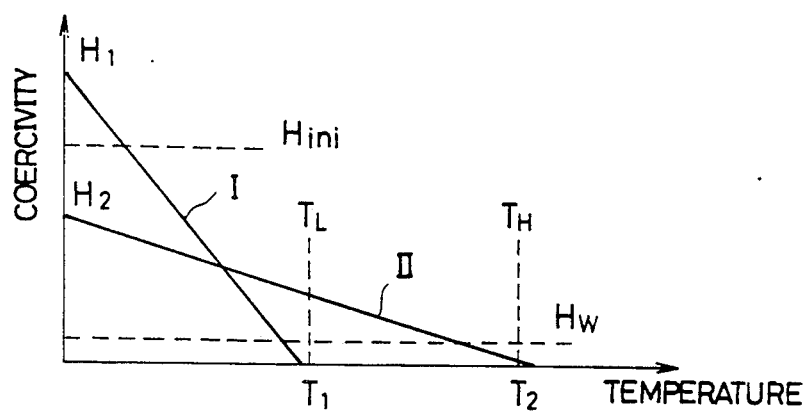
FIG. 3 is a graph illustrating how coercivity concerns with a temperature in a magnetic layer.

FIG. 2 shows an expanded view illustrating a portion of the magnetic layers. FIG. 3 shows a graph illustrating how coercivity concerns with a temperature in the magnetic layers.

As shown in FIG. 2, the magnetic layers 3 provides a memory layer 21 and an auxiliary layer 22. The memory layer 21 is made of such a material that has large coercivity $H_1$ in an ambient temperature and a relatively low Curie point $T_1$ (at which the coercivity becomes substantially '0'). The relation between the temperature and the coercivity of the memory layer 21 is exemplified by a line I as shown in FIG. 3. The auxiliary layer 22 is made of such a material that has relatively small coercivity $H_2$ in an ambient temperature and a higher Curie point $T_2$. The relation between the temperature and the coercivity of the auxiliary layer 22 is exemplified by a line II as shown in FIG. 3.

Light-intensity modulated overwriting method will be described.

At an initializing process, the initializing magnetic field $H_{ini}$ is applied in the direction shown in FIG. 2 in order to initialize the magnetization of the auxiliary layer 22 in one direction, that is, the lower direction as shown in FIG. 2. The magnetization of the memory layer 21 is reversed, because the coercivity $H_1$ is larger than the initializing magnetic field $H_{ini}$ as shown in FIG. 3.

A recording is achieved by irradiating the magneto-optical memory elements 1 with a laser beam whose intensity is modulated to a high or low level as the recording magnetic field $H_w$ is being applied thereto.

Figure 4:
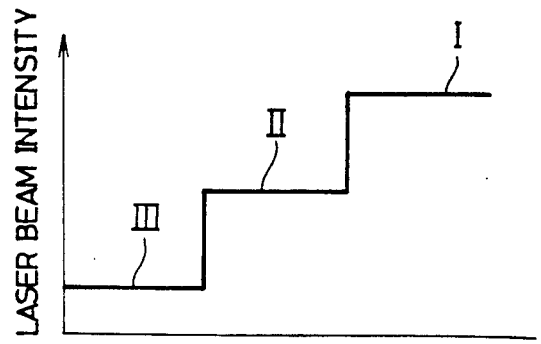
FIG. 4 is a chart illustrating how intensity of a laser beam changes.

FIG. 4 shows a chart illustrating how intensity of a laser beam changes.

That is, when the high-level laser beam shown by the I level of FIG. 4 is irradiated, the temperature of the memory layer 21 and the auxiliary layer 22 are both raised to a point $T_H$ which is near or higher than the Curie points $T_2$ and $T_1$. When the low-level laser beam shown by the II level of FIG. 4 is irradiated, the temperature of the memory layer 21 is only raised to a point $T_L$ which is near or higher than the Curie point $T_1$.

As such, when the high-level laser beam is irradiated, the recording magnetic field $H_w$ reverses the magnetization of the auxiliary layer 22 in the upward direction shown in FIG. 2. The direction of the magnetization of the memory layer 21 is the same as that of the magnetization of the auxiliary layer 22 by virtue of the exchange force effected on the interface in a cooling process. The magnetization of the memory layer 21 is, thus, directed upward.

When the low-level laser beam is irradiated, on the other hand, the recording magnetic field $H_w$ gives no effect on reversing of the magnetization of the auxiliary layer 22. Like the foregoing case, the direction of magnetization of the memory layer 21 becomes the same as that of the magnetization of the auxiliary layer 22 in the cooling process. It results in directing the magnetization of the memory layer 21 downward as viewed in FIG. 2.

In addition, as shown in FIG. 3, the recording magnetic field $H_w$ is adjusted to be much smaller than the initializing magnetic field $H_{ini}$.

Further, as shown by the III level of FIG. 4, the laser beam intensity given in a reading is adjusted to be much lower than that in a recording.

A recording and reading device 7 for recording and reading an information signal to and from the magneto-optical memory elements 1 by means of the light-intensity modulated overwriting method includes a spindle motor 8 for rotating the magneto-optical memory elements 1 at a predetermined rotation speed, an optical head 9 having a laser source (not shown) for irradiating a laser beam to the magneto-optical memory elements 1 and an objective lens 10, and a beam control unit (not shown) for modulating the intensity of the laser beam in response to a recording signal into two, high and low, levels as shown by the stages I and II of FIG. 4.

The recording and reading device 7, further, includes an electromagnet 11 serving as means for applying the recording magnetic field $H_w$ and the initializing magnetic field $H_{ini}$, a power source 12 for applying a voltage to the electromagnet 11, and a controller 13 serving as means for controlling the quantity and direction of the current flowing through the electromagnet 11 by controlling the quantity and direction of a voltage applied from the power source 12 to the electromagnet 11 and selectively generating either one of the recording magnetic field $H_w$ and the initializing magnetic field $H_{ini}$.

Figure 5:
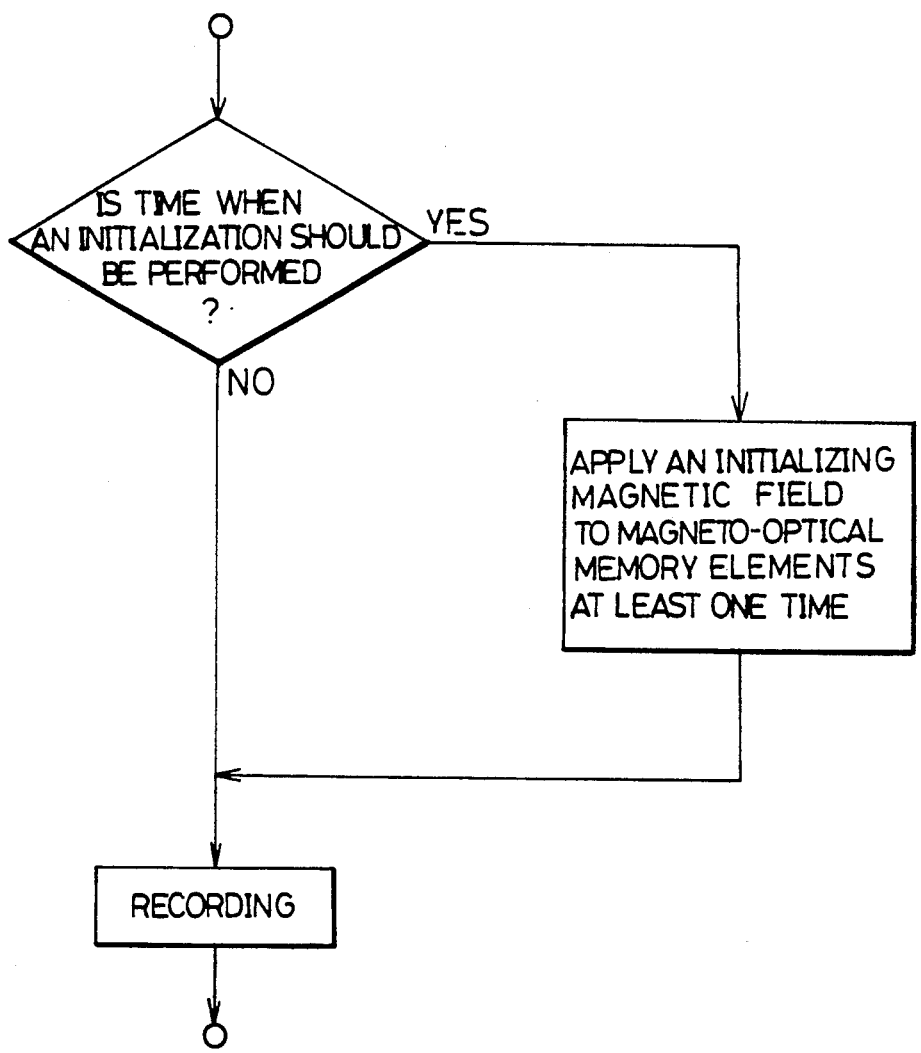
FIG. 5 is a diagram illustrating when an initializing magnetic field is applied to the magneto-optical memory elements.

FIG. 5 shows a diagram illustrating when the initializing magnetic field $H_{ini}$ is applied to the magneto-optical memory elements 1.

The controller 13 is designed to apply the recording magnetic field $H_w$ from the electromagnet 11 to the magneto-optical memory elements 1 and apply the initializing magnetic field $H_{ini}$ from the electromagnet 11 to the magneto-optical memory elements 1 at least one time between the point of time when setting the magneto-optical memory elements on a recording or reading position, finishing a reading or recording, and making sure of the operations such as recording or erasing and the point of time when subsequent recording begins as shown in FIG. 5.

With the foregoing arrangement, when recording an information signal on the magneto-optical memory elements 1, by irradiating a high-level or low-level laser beam from the laser source as applying the recording magnetic field $H_w$ from the electromagnet 11, a desired signal is recorded on the memory layer 21 of the magnetic layers 3. The magnetization of the memory layer 21 is reversed to the opposite direction depending the intensity level, high or low, of the laser beam as described above.

By applying the initializing magnetic field $H_{ini}$ to the magneto-optical memory elements 1 at least one time between the point of time when setting the magneto-optical memory elements on a recording or reading position, finishing a reading or recording, and making sure of the operations such as recording or erasing and the point of time when subsequent recording begins, it is possible to keep the auxiliary layer 22 constantly initiated. Moreover, the present embodiment is designed to apply the recording magnetic field $H_w$ and the initializing magnetic field $H_{ini}$ to the same position, that is, by the one electromagnet 11. If, therefore, the magneto-optical memory elements 1 are accommodated in a cartridge case, the recording magnetic field $H_w$ and the initializing magnetic field $H_{ini}$ are positively applied to the magneto-optical memory elements 1.

Further, since the one electromagnetic 11 serves as means for applying the recording magnetic field $H_w$ and the initializing magnetic field $H_{ini}$, it is possible to reduce the number of parts.

In addition, when reading the signal, by irradiating a lower laser beam as shown by the III level of FIG. 4 than that in a recording mode, the signal recorded on the memory layer 21 is allowed to be read.

Next, a second embodiment of the present invention will be described with reference to FIG. 4 and FIG. 6.

FIG. 6 shows a view illustrating magneto-optical memory elements and a recording and reading device of the magneto-optical memory elements according to a second embodiment of the invention.

As shown in FIG. 6, magneto-optical memory elements 1 have the same arrangement as that described in the first embodiment. Herein, the similar elements are referenced by the similar numbers and the overlapped description is left out.

Like the first embodiment, a recording and reading device 27 for recording and reading an information signal to and from the magneto-optical memory elements 1 by means of the light-intensity modulated overwriting method includes a spindle motor 28 for rotating the magneto-optical memory elements 1 at a predetermined rotation speed, an optical head 29 having a laser source (not shown) for irradiating a laser beam to the magneto-optical memory elements 1 and an objective lens 30, and a beam control unit (not shown) for modulating the intensity of the laser beam in response to a recording signal into two, high and low, levels as shown by the stages I and II of FIG. 4.

The recording and reading device 27, further, includes a first permanent magnet 31 served as means for applying the recording magnetic field $H_w$, a second permanent magnet 32 served as means for applying the initializing magnetic field $H_{ini}$, a supporting member 33 for supporting the first permanent magnet 31 and the second permanent magnet 32 on both opposite ends. The supporting member 33 is rotatably supported by a stepping motor 34 served as means for alternately moving the first permanent magnet 31 and the second permanent magnet 32. When the supporting member 33 is rotated 180° by the stepping motor 34, either one of the first permanent magnet 31 and the second permanent magnet 32 is selectively directed to the magneto-optical memory elements 1. A power source 35 is provided for feeding the stepping motor 34 and is controlled by a controller 36.

The controller 36 serves as means for controlling the recording magnetic field $H_w$ and the initializing magnetic field $H_{ini}$. As such, it brings the first permanent magnet 31 in opposition to the magneto-optical memory elements 1 when recording an information signal. On the other hand, it brings the second permanent magnet 32 in opposition to the magneto-optical memory elements 1 at least one time between the point of time when setting the magneto-optical memory elements on a recording or reading position, finishing a reading or recording, and making sure of the operations such as recording or erasing and the point of time when subsequent recording begins. The recording and reading operation is not descriptive, because it is the same as that described in the first embodiment.

According to the foregoing two embodiments, the magnetic layers 3 are designed to have two layers of the memory layer 21 and the auxiliary layer 22. The memory layers 3, however, may have three layers further containing a medium layer (see SPIE Vol. 1078 Optical Data Storage Topical Meeting (1989) pp 258-264) for reducing the initializing magnetic field $H_{ini}$ between the memory layer 21 and the auxiliary layer 22. Further, the magnetic layers 3 may have four or more layers containing those layers.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magneto-optical recording and reading method of recording and reading an information signal to and from magneto-optical memory elements at a predetermined position by means of a light-intensity modulated overwriting method employing a recording magnetic field and an initializing magnetic field, said magneto-optical memory elements including at least two magnetic layers magnetically coupled and laminated, said magneto-optical recording and reading method comprising the steps of:

applying the recording magnetic field and the initializing magnetic field to said magneto-optical memory elements at the predetermined position, said recording magnetic field being applied to said magneto-optical memory elements during the performance of a recording operation of the information signal, said initializing magnetic field being applied to said magneto-optical memory elements when a reading or recording operation of the information signal is finished; and recording or reading the information signal to or from said magneto-optical memory elements.

2. A magneto-optical recording and reading method according to claim 1, wherein said at least two magnetic layers consist of a memory layer and an auxiliary layer, said memory layer being made of a material having large coercivity in an ambient temperature and a low Curie point, and said auxiliary layer being made of a material having small coercivity in an ambient temperature and a higher Curie point than that of said memory layer.

3. A magneto-optical recording and reading method according to claim 1, wherein said recording magnetic field and said initializing magnetic field are applied by a single electromagnet at said predetermined position.

4. A magneto-optical recording and reading method according to claim 1, wherein said recording magnetic field and said initializing magnetic field are applied by different magnets, said magneto-optical recording and reading method further comprising the step of alternately moving one or another of said different magnets to said predetermined position for applying either said recording magnetic field or said initializing magnetic field, respectively.

5. A magneto-optical recording and reading method according to claim 1, wherein the initializing magnetic field is applied to said magneto-optical memory elements at the same position where the recording magnetic field is applied and said initializing magnetic field is of a higher magnitude than said recording magnetic field.

* * * * *